(12) United States Patent
Davies et al.

(10) Patent No.: US 7,161,897 B1
(45) Date of Patent: Jan. 9, 2007

(54) COMMUNICATIONS SYSTEM, APPARATUS AND METHOD THEREFOR

(75) Inventors: Elwyn B Davies, Ely (GB); Catherine Rosenberg, West Lafayette, IN (US)

(73) Assignee: Nortel Networks Limited, St. Laurent (CA)

( * ) Notice: Subject to any disclaimer, the term of this patent is extended or adjusted under 35 U.S.C. 154(b) by 965 days.

(21) Appl. No.: 09/723,019

(22) Filed: Nov. 27, 2000

(51) Int. Cl.
*H04J 1/16* (2006.01)
*H04J 3/14* (2006.01)

(52) U.S. Cl. ............... 370/217; 370/225; 370/352
(58) Field of Classification Search .......... 370/338, 370/400–401, 464–465, 408, 392–393, 352, 370/216–220, 225, 227, 228; 455/433
See application file for complete search history.

(56) References Cited

U.S. PATENT DOCUMENTS

| | | | | |
|---|---|---|---|---|
| 6,480,900 B1 * | 11/2002 | Habert | .................... | 709/245 |
| 6,501,741 B1 * | 12/2002 | Mikkonen et al. | .......... | 370/310 |
| 6,587,457 B1 * | 7/2003 | Mikkonen | .................... | 370/356 |
| 6,681,259 B1 * | 1/2004 | Lemilainen et al. | ......... | 709/250 |
| 6,735,202 B1 * | 5/2004 | Ahmed et al. | ............... | 370/392 |
| 6,742,036 B1 * | 5/2004 | Das et al. | .................... | 709/226 |

* cited by examiner

*Primary Examiner*—John Pezzlo
*Assistant Examiner*—Inder Pal Mehra
(74) *Attorney, Agent, or Firm*—Barnes & ThornburgLLP

(57) ABSTRACT

In the Internet, a domain can be multi-homed to a first and a second domain by a first path and a second path, respectively. If one of the first or second paths becomes unavailable, a path still remains to communicate with a host attached to the multi-homed domain. However, due to the requirements of IPv6 in relation to allocating addresses to domains, packets received via the remaining path during a communication will not be recognised by the host at a transport layer. Therefore, the present invention overcomes this problem by making use of a dynamic address variation facility of IPv6 used for mobile nodes. The dynamic address variation facility also, advantageously, can act as a replacement for a content switch and can maintain communication of packets to and from the host as a result of a change of IP address of the host caused by, for example, an administrative need to change the IP address of the host.

23 Claims, 9 Drawing Sheets

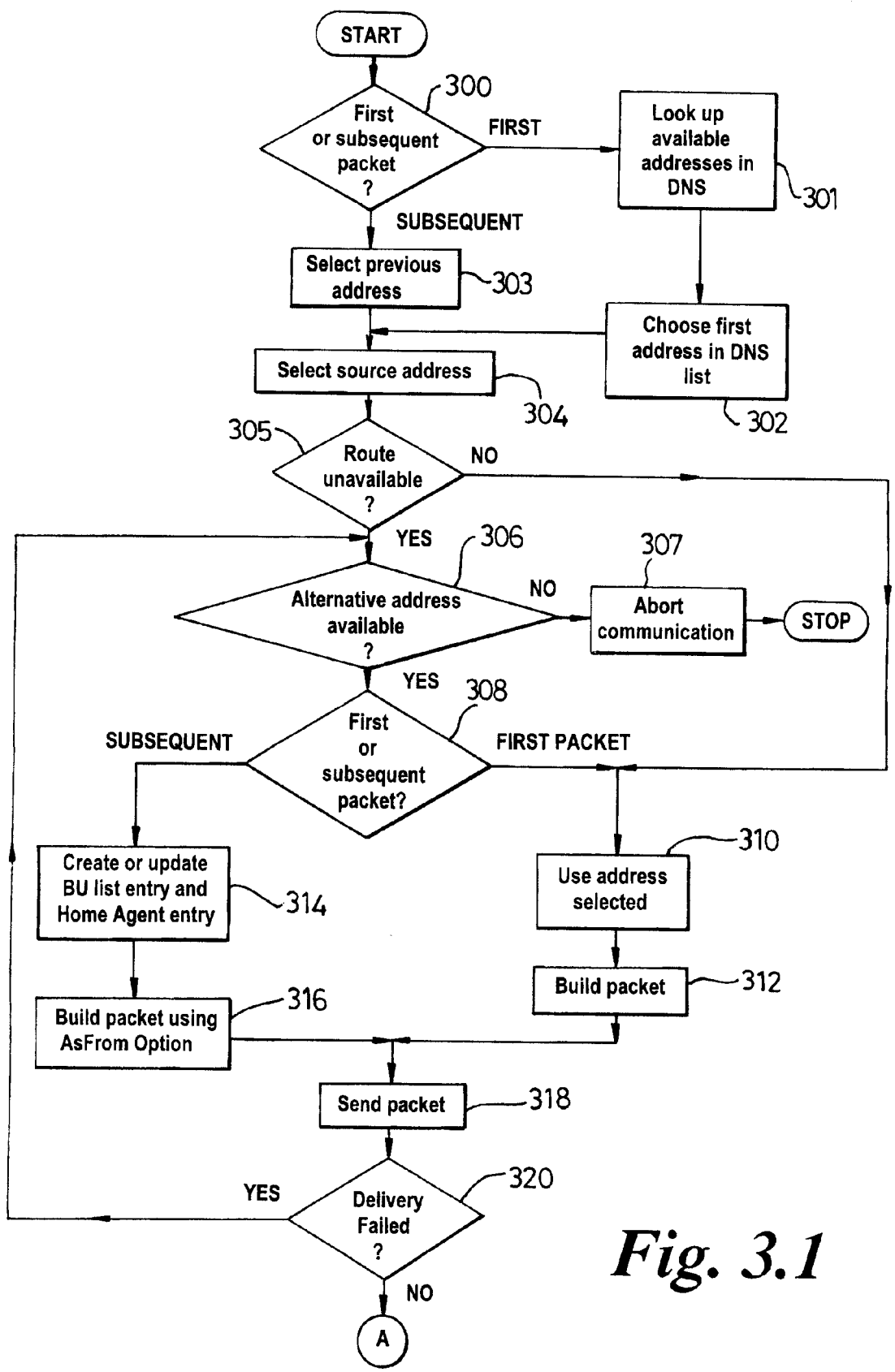
Fig. 3.1

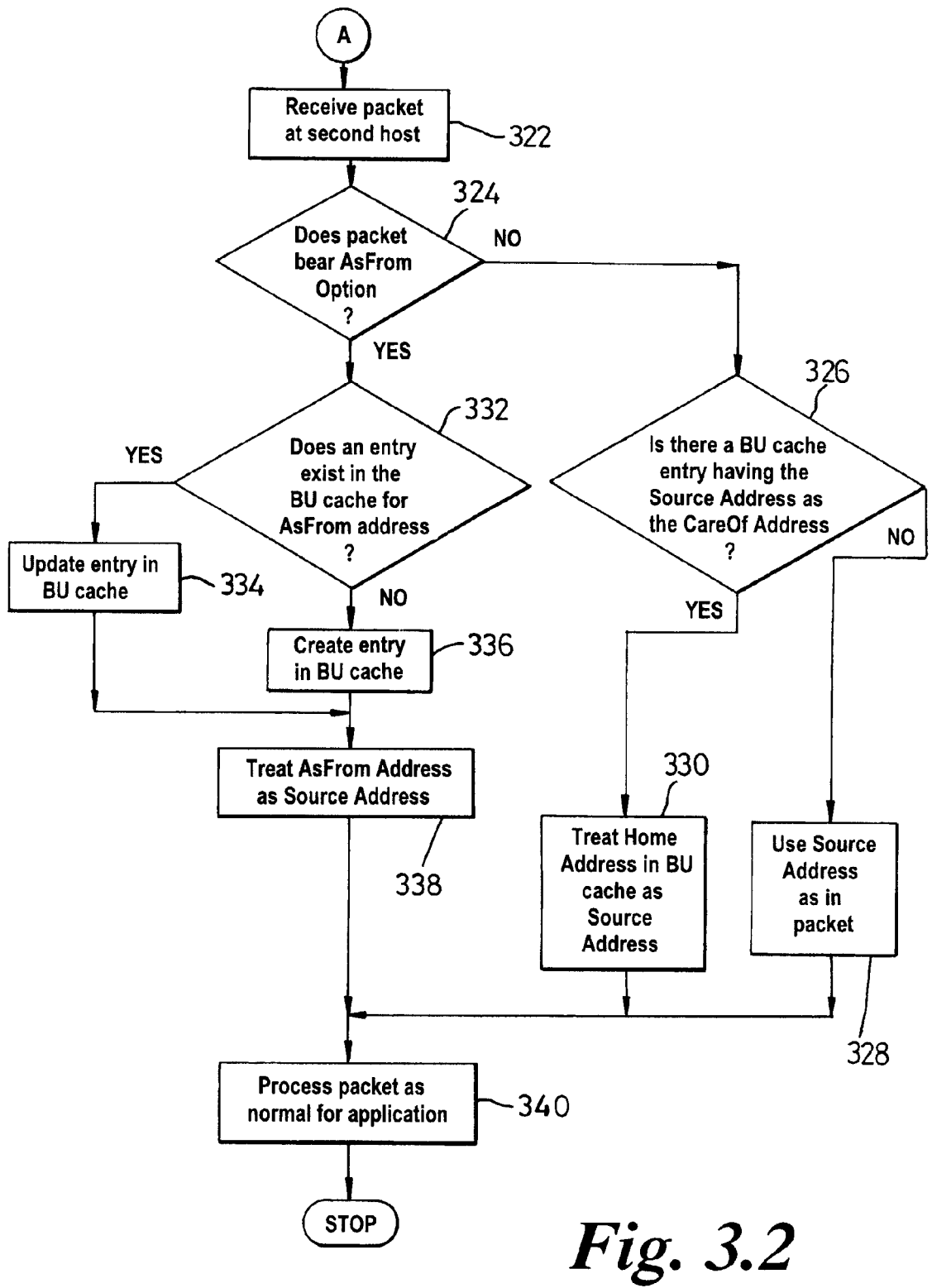
Fig. 3.2

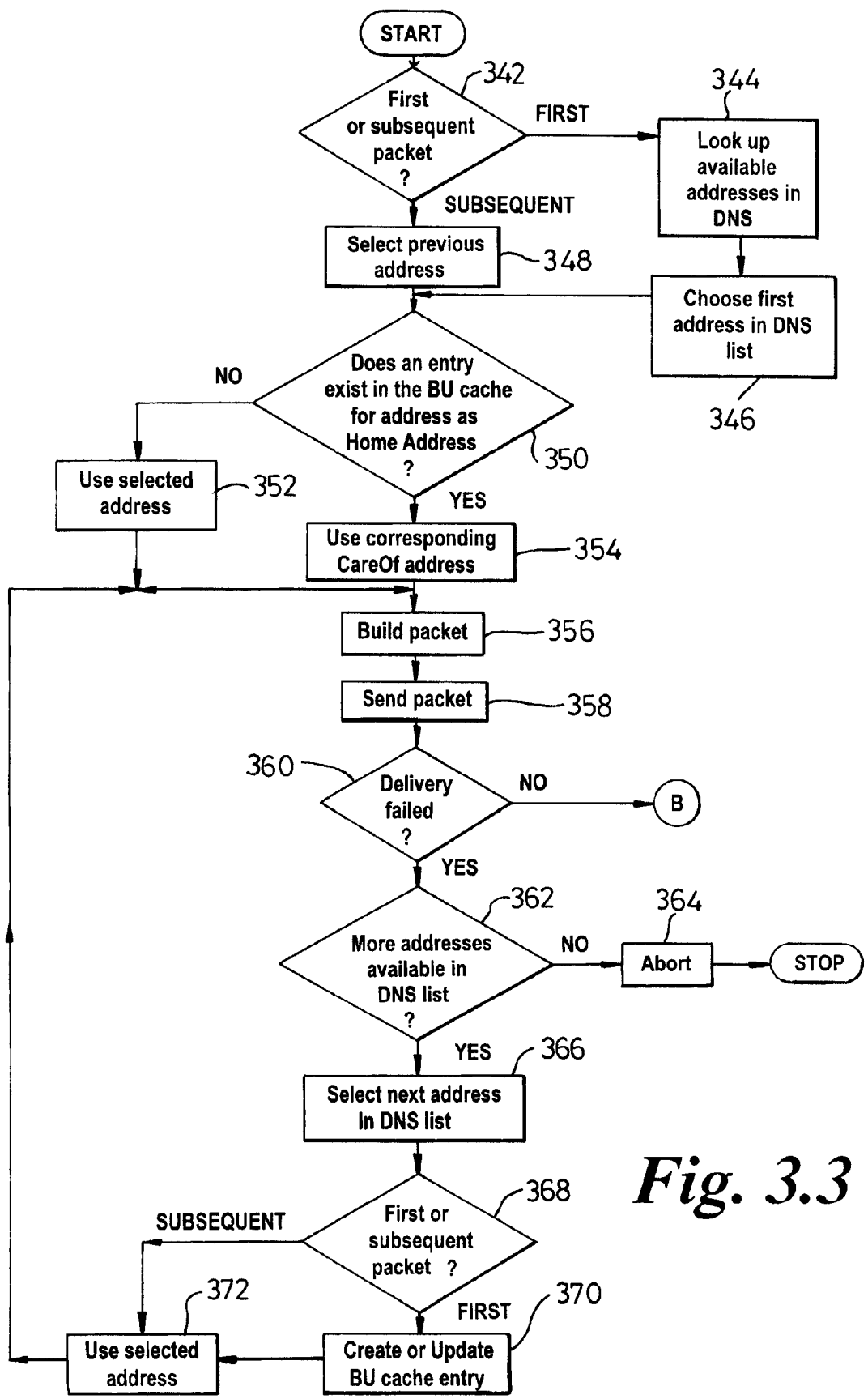
Fig. 3.3

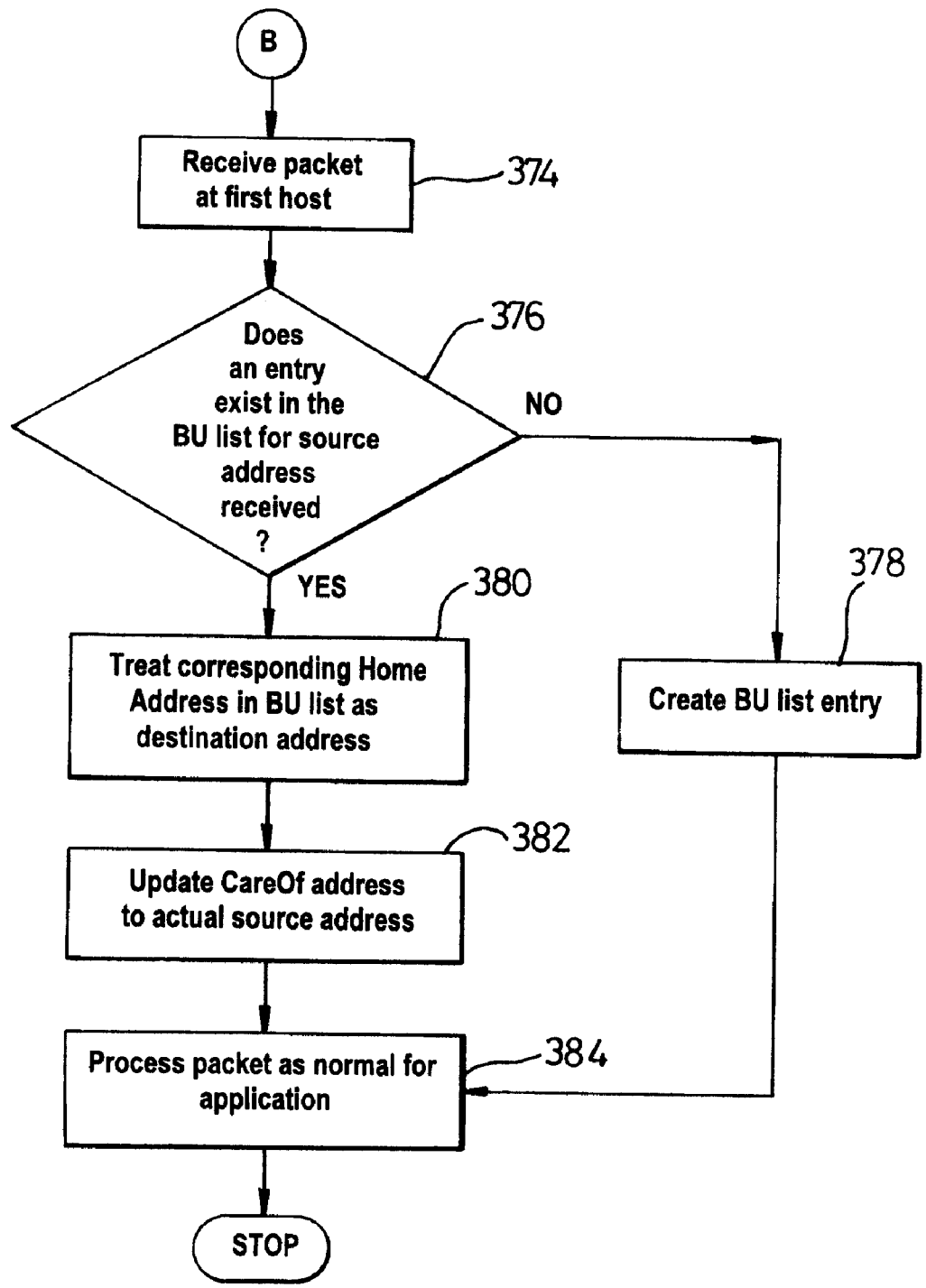
Fig. 3.4

COMMUNICATIONS SYSTEM, APPARATUS AND METHOD THEREFOR

FIELD OF THE INVENTION

The present invention relates to a communications system of the type used to communicate packets between nodes, for example packets, structured in accordance with an Internet Protocol (IP), such as IPv6. The present invention also relates to a node apparatus for use in the above communications system and a method for use by the above system and/or node apparatus.

BACKGROUND OF THE INVENTION

The Internet is a network of computer networks capable of allowing a first node attached to the network of computer networks to communicate with a second node attached to the network of computer networks, nodes being defined herein as including hosts or routers. The Internet was conceived by the Advanced Research Projects Agency (ARPA) of the US Government in 1969 as a network to allow users of a research computer at one university to be able to "talk to" research computers at other universities; the network was known as the Advanced Research Projects Agency Network. The ARPA Network was capable of routing or re-routing messages in more than one direction and so was able to continue functioning even if parts of the ARPA Network were destroyed, for example, as a result of a military attack or other disaster.

Presently, the Internet is public and is used by a large number of users throughout the world, the interconnection of the computer networks forming the Internet being supported by resources of current public telecommunications systems worldwide.

The Internet comprises administrative routing domains known as Autonomous Systems (ASs), each routing domain having associated therewith a respective set of Internet Protocol (IP) addresses. The Internet employs, inter alia, an IP Layer, the IP Layer serving to direct or route packets from a source to a destination, guided by an IP address of the destination, the destination being a node, such as a host or router. The Internet also employs a Transport Layer, generally in accordance with the Open Systems Interconnection (OSI) model for communications.

The ASs partition the Internet into mutually exclusive routing domains. In each AS, allocation of IP addresses and all other operational mechanisms is generally controlled by a single administrative authority. In IP version 6 (IPv6), the IP addresses comprise a 128 bit binary number. As disclosed in Section 2.5.7 of Request For Comments (RFC) 2373, entitled "IPv6 Addressing Architecture" (July 1998) and RFC 2374, entitled "IPv6 Aggregatable Global Unicast Address Format" (July 1998), a hierarchical organisation is imposed on the routing domains. A first plurality of the routing domains are Top Level Aggregators (TLAs), the TLAs forming a topmost level of the hierarchical organisation, known as a default-free zone. In order to be designated as one of the TLAs, a given routing domain has to have connectivity with other TLAs such that a packet bearing any IPv6 IP address (hereinafter referred to as an "IP Address") can be routed through the TLAs to a correct one of the TLAs associated with the IP address.

A second plurality of the routing domains can subtend from one or more of the TLA, the second plurality of the routing domains being known as Next Level Aggregators (NLAs). The NLAs constitute a next highest level of the hierarchical organisation, the NLAs subtending from the one or more of the TLAs capable of sending and receiving packets from the one or more TLA. A plurality of lower levels of NLAs may also exist and subtend from the next highest level of the hierarchical organisation in a same way as the next highest level subtends from the topmost level. A lowest level of the NLAs is also said to comprise Site Level Aggregators (SLAs).

Authority to allocate IP addresses from a respective portion of IPv6 address space is delegated to each routing domain, the address space being a totality of positive binary numbers that can be represented by 128 bits. An administrative authority of the each routing domain can allocate the respective IP addresses delegated thereto, either to hosts or routers within the each routing domain, or further delegate, to a subtending routing domain at a level beneath the each routing domain in the hierarchical organisation, authority to allocate a portion of addresses from the respective portion of IPv6 address space already allocated to the each routing domain.

Overall allocation authority is vested in the Internet Assigned Numbers Authority (IANA) which is part of the Internet Corporation for Assigned Numbers and Names (ICANN). IANA delegates authority for tranches of the IPv6 address space to three geographical regional authorities: Reséau IP Européen (RIPE), American Registry for Internet Names (ARIN), and Asia Pacific Network Information Centre (APNIC). The three geographical regional authorities, in turn, delegate authority to the TLAs respectively operating in the three geographical regions.

At each stage of delegation, the IP addresses delegated comprise a block of IP addresses in which the 128 bit binary numbers have a common pattern of digits in a leftmost, or most significant, part of the 128 bit binary number. The common pattern of digits is known as a prefix and identifies the block of IP addresses; the block of IP addresses is characterised by the prefix and a number of bits in the prefix, known as a prefix length.

The routing domains, and especially the TLAs, are required under IPv6 to adopt a policy for routing unicast traffic in which each routing domain only routes traffic to lower level routing domains subtending from each routing domain when the lower level routing domains have destination addresses according to RFC 2374 that are refinements of a prefix of the each routing domain. Consequently, each routing domain only has to advertise the prefix of the each domain to peers of the each domain through routing protocols. Such routing policy is known as "strong/strict aggregation" and requires, rather than suggests as in IP version 4 (IPv4), that IP addresses of the lower level routing domains (inferior domains) form a block of IP addresses specified by the prefix of the each domain (superior domain).

Increasingly, in order to assist with avoiding certain denial of service attacks, the superior domain is only accepting traffic from the inferior domains bearing source addresses within the block of IP addresses allocated to the inferior domains.

It is known for a first, non-TLA, routing domain to be connected, at the IP layer, to a second routing domain disposed above the first routing domain in the hierarchical organisation. In order to make an IPv6 service more robust, i.e. provide more diverse routes to the default-free zone, the first routing domain is connected to a third routing domain; the third routing domain is also above the first routing domain in the hierarchical organisation. The provision of multiple alternative routes to the default-free zone is known as "multi-homing". However, the strong aggregation requires both the second and third routing domains to delegate separate sets of IP addresses to the first routing domain in order to send and receive packets through the second and third routing domains, respectively. The connection via the first and second routing domains constitutes a first route, and the connection via the first and third routing domains constitutes a second route.

In order for a packet, inbound to the first routing domain, sent by one of the first or second routes to be correctly routed, the inbound packet needs to bear a destination address corresponding a route taken, because the destination address of the inbound packet needs to match the prefix of the TLA from which the route taken subtends. Likewise, a source address of a packet, outbound from the first domain, needs to match the prefix of the TLA from which the route taken subtends, otherwise the outbound packet will be discarded as "bogus", because the outbound packet will appear not to originate from a domain corresponding to the source address.

In this respect, a first host attached to the first domain is capable of sending packets to a second host at a second point of attachment to the Internet. The first host has a first IP address and a second IP address, the first and second IP addresses being delegated by the TLAs from which the second and third routing domains ultimately subtend. Since the first routing domain is multi-homed, the packets can be routed via the second or the third routing domains, depending upon whether the first host selects the first IP address or the second IP address using an address selection technique.

"Default Address Selection for IPv6" by R. Draves (<draft-ieff-ipngwg-default-addr-select-01.txt>, July 2000) discloses a proposed address selection technique for determining most preferred source and destination addresses for a communication where one or both of the source and destination of the communication have multiple alternative IP addresses, for example, the first, multi-homed, routing domain. Using the proposed address selection technique, the second host, trying to initiate communications with the first host, looks-up a name of the first host in a Domain Name System (DNS) to obtain a list of IP addresses corresponding to the first host. The second host selects one of the IP addresses from the list, according to the proposed address selection technique and builds and sends packets to a first IP address (from the list) of the first host as a destination address and using a preferred IP address of the second host as a source address. As the packets are routed to the first host, the packets undergo a number of known checks to ensure that the source address is valid.

If a first path between the first and second domains becomes unavailable, an Internet Control Management Protocol (ICMP) "Destination Unreachable" message is sent to the second host. Upon receipt of the ICMP message, if the second host is initiating a communication with the first host, i.e. a first packet is being sent by the second host to the first host, the second host can try an alternative IP address, i.e. the second IP address from the list of IP addresses supplied by the DNS. Alternatively, if the communication between the first and second hosts is already underway using a Transmission Control Protocol (TCP) connection, the communication has to be terminated and re-established, because the TCP connection can not alter the destination address to the second IP address once the TCP connection is bound to the first IP address.

The source and destination addresses of return packets from the first host in reply to packets received from the second host are formed by interchanging the source and destination addresses of the packets received from the second host. The return packets are routed according to policy in the first routing domain through one of the TLAs, selecting either the first route or the second route according to the source address in the return packets. If one of the first or second routes becomes unavailable whilst trying to route the return packets, the communication has to be terminated, because the return packets can not be redirected once the communication is in progress.

If the communication is established by the first host to the second host, the first host initially looks-up the domain name of the second host in the DNS in order to obtain the IP address of the second host. In reply, the DNS provides another list of IP addresses corresponding to the domain name of the second host. The first host selects one of the IP addresses from the list, according to the proposed address selection technique, and builds and sends packets to the IP address of the second host as a destination address and uses the first or second IP address of the first host as a source address. The selection of the first or second IP address of the first host as the source address depends upon the above-mentioned address selection technique in the first routing domain. As the packets are routed to the second host, the packets undergo a number of known checks to ensure that the source address is valid. If the first route becomes unavailable, no mechanism currently exists to inform the first host to use the second IP address of the first host as the source address instead of the first IP address of the first host, thereby selecting the second route. Additionally, packets originating from the second host can not pass through the unavailable route and no mechanism exists to advise the second host to use the second route. Also, for future communications with the first host, there is no way of altering the address selection technique so as to take advantage of the second route.

A similar situation to that described above can occur if the first or second path is replaced by a third path between the first domain and a fourth domain.

Additionally, if the first host decides to use a different domain, or a different IP address is assigned to the first host, as a result of an administrative decision, irrespective of whether the first host is multi-homed, for example by a decision of a proprietor of the first domain, there is currently no facility in the IPv6 to enable the different IP address to be reached instead of the first or second IP addresses.

In a different scenario, a first access network and a second access network is provided, possibly at a single topological point of attachment to the Internet. The first access interface operates in accordance with a first type of access technique and the second access interface operates in accordance with a second type of access technique. At present, a technique does not exist to enable the first host to hand-over a communication, at an IP Level, between the first and second access interfaces if the first host decides to communicate with the second host via the second access network instead of the first access network.

In another scenario, to balance traffic loading between a large number of hosts and a single content server, it is known for a content provider to have a number of web servers connected to a gateway or content switch, thereby providing a degree of redundancy and traffic load sharing, to enable the content provider to support a large number of requests for content. For a host to access content, the host looks-up a host name part of a URL of the content. In reply, the DNS provides the host with an IP address of the content switch. The host then tries to establish a communication with the content switch. The content switch, as the name suggests, switches packets from the host to one of the web servers.

Similarly, packets from the one of the web servers to the host are switched through the content switch to the host. However, the provision of the content switch is accompanied by a financial cost and introduces a time delay between the host and the web servers. Additionally, the provision of the content switch is usually accompanied by a restriction to providing the web servers and the content switch in a same geographical location.

An alternative way of providing communications between the host and the one of the web servers is by use of a dynamic DNS technique. In this alternative, the host looks-up the URL of the content. In reply, the DNS selects an IP address of the one of the web servers, the choice of web server being dictated by a selection policy, such as strict rotation, or lowest traffic loading policy. The selected IP address is then used by the host to communicate with the one of the web content servers.

SUMMARY OF THE INVENTION

According to a first aspect of the present invention, there is provided a communications system comprising a first node having a first address, the first node being capable of communicating with a second node via a communications network in accordance with a communications protocol, the communications protocol having a dynamic address variation facility for managing mobility of the first node with respect to the communications network, wherein the communications protocol is arranged to use the dynamic address variation facility to support a use of a second address to identify the first node instead of the first address in response to a non-mobility related requirement to use the second address to identify the first node for communicating a packet between the first node and the second node.

By definition, the dynamic address variation facility for managing mobility allows a correspondent node to use a "home" address to reach, in a communications sense, a mobile node. The mobile node can use one or more address to respond to the correspondent node, the one or more address can be varied once, or more, during a single communication session with the correspondent node. In effect, the dynamic address variation facility conceals the address variation from the transport layer.

The packet may be, for example an Internet Protocol (IP) packet, such as a packet structured in accordance with version 6 of the IP. In IPv6, the structure of the packet includes fields for a destination address of the packet, a source address of the packet, a transport protocol used, optional information, for example relating to the dynamic address variation facility, and a payload. The optional information relating to the dynamic address variation facility comprises an option to request the update of a CareOf address (known as a "Binding Update Option") and an option to record a Home address (known as a "Home Address Option"). Hereinafter references to a packet containing an "AsFrom Option" are references to the packet containing both the Binding Update Option and the Home Address Option.

Preferably, the non-mobility related requirement to use the second address to identify the first node for communicating a packet between the first node and the second node is a requirement to use the second address as a result of all routes between the first and second nodes corresponding to the first address becoming deprecated in relation to the first node.

Preferably, the non-mobility related requirement to use the second address to communicate a packet between the first node and the second node is a requirement to use the second address as a result of all routes between the first and second nodes corresponding to the first address failing or becoming unavailable in relation to the first node.

Preferably, the non-mobility related requirement to use the second address to communicate a packet between the first node and the second node is a requirement to route the packet originating from the second node to a third node. More preferably, the third node corresponds to one of a plurality of hosts, a number of the plurality of hosts being capable of providing a substantially same content as each other.

According to a second aspect of the present invention, there is provided a communications system comprising a first node having a first address associated with routing packets from a second node to the first node via a first communications access network of a first type and a second address associated with routing packets from the second node to the first node via a second access network of a second type; the first and second types are different and interconnected by an intermediary network, the first and second access networks and the intermediary network being arranged to operate in accordance with a communications protocol having a dynamic address variation facility for managing mobility of the first node, wherein the communications protocol is arranged to use the dynamic address variation facility to support a use of the second address instead of the first address to identify the first node for communicating a packet between the first node and the second node in response to a requirement of the first node to communicate with the second node via the second access network instead of the first access network.

By definition, the dynamic address variation facility for managing mobility allows a correspondent node to use a "home" address to reach, in a communications sense, a mobile node. The mobile node can use one or more address to respond to the correspondent node, the one or more address can be varied once, or more, during a single communication session with the correspondent node. In effect, the dynamic address variation facility conceals the address variation from the transport layer.

The first and second access networks may be located at a same topological point of attachment to the communications network. The first and/or second access networks may be a wireless network.

According to a third aspect of the present invention, there is provided a node apparatus for a communications network, the apparatus comprising a first address and being capable of communicating with a second node via the communications network in accordance with a communications protocol, the communications protocol having a dynamic address variation facility for managing mobility of the node apparatus with respect to the communications network, wherein the communications protocol is arranged to use the dynamic address variation facility to support a use of a second address to identify the first node instead of the first address in response to a non-mobility related requirement to use the second address to identify the first node for communicating a packet between the first node and the second node.

Preferably, the non-mobility related requirement to use the second address to identify the first node for communicating a packet between the first node and the second node is a requirement to use the second address as a result of all routes between the first and second nodes corresponding to the first address becoming deprecated in relation to the first node.

Preferably, the non-mobility related requirement to use the second address to communicate a packet between the first node and the second node is a requirement to use the second address as a result of all routes between the first and second nodes corresponding to the first address failing or becoming unavailable in relation to the first node.

Preferably, the non-mobility related requirement to use the second address to communicate a packet between the first node and the second node is a requirement to route the packet originating from the second node to a third node. More preferably, the third node corresponds to one of a plurality of hosts, a number of the plurality of hosts being capable of providing a substantially same content as each other.

According to a fourth aspect of the present invention, there is provided a node apparatus for a communications network, the apparatus comprising a first address associated with routing packets from a second node to the first node via a first access network of a first type and a second address associated with routing packets from the second node to the first node via a second access network of a second type; the first and second types are different and interconnected by an intermediary network, the first and second access networks and the intermediary network being arranged to operate in accordance with a communications protocol having a dynamic address variation facility for managing mobility of the node apparatus, wherein the communications protocol arranged to use the dynamic address variation facility to support a use of the second address instead of the first address to identify the first node for communicating a packet between the first node and the second node in response to a requirement of the first node to communicate with the second node via the second access network instead of the first access network.

According to a fifth aspect of the present invention, there is provided a method of routing packets destined for a first node having a first address, the first node being capable of communicating with a second node via a communications network in accordance with a communications protocol, the communications protocol having a dynamic address variation facility for managing mobility of the first node with respect to the communications network, the method comprising the step of: using the dynamic address variation facility to support a use of a second address to identify the first node instead of the first address in response to a non-mobility related requirement to use the second address to identify the first node for communicating a packet between the first node and the second node.

By definition, the dynamic address variation facility for managing mobility allows a correspondent node to use a "home" address to reach, in a communications sense, a mobile node. The mobile node can use one or more address to respond to the correspondent node, the one or more address can be varied once, or more, during a single communication session with the correspondent node. In effect, the dynamic address variation facility conceals the address variation from the transport layer.

The packet may be, for example an Internet Protocol (IP) packet, such as a packet structured in accordance with version 6 of the IP. In IPv6, the structure of the packet includes fields for a destination address of the packet, a source address of the packet, a transport protocol used, optional information and a payload.

Preferably, the non-mobility related requirement to use the second address to identify the first node for communicating a packet between the first node and the second node is a requirement to use the second address as a result of all routes between the first and second nodes corresponding to the first address becoming deprecated in relation to the first node.

Preferably, the non-mobility related requirement to use the second address to communicate a packet between the first node and the second node is a requirement to use the second address as a result of all routes between the first and second nodes corresponding to the first address failing or becoming unavailable in relation to the first node.

Preferably, the non-mobility related requirement to use the second address to communicate a packet between the first node and the second node is a requirement to route the packet originating from the second node to a third node. More preferably, the third node corresponds to one of a plurality of hosts, a number of the plurality of hosts being capable of providing a substantially same content as each other.

According to a sixth aspect of the present invention, there is provided a method of routing packets destined for a first node having a first address associated with routing the packets from a second node to the first node via a first access network of a first type and a second address associated with routing packets from the second node to the first node via a second access network of a second type; the first and second types are different and interconnected by an intermediary network, the first and second access networks and the intermediary network being arranged to operate in accordance with a communications protocol having a dynamic address variation facility for managing mobility of the first node, the method comprising the step of: using the dynamic address variation facility to support a use of the second address instead of the first address to identify the first node for communicating a packet between the first node and the second node in response to a requirement of the first node to communicate with the second node via the second access network instead of the first access network.

According to a seventh aspect of the present invention, there is provided computer executable software code stored on a computer readable medium, the code being routing packets destined for a first node having a first address, the first node being capable of communicating with a second node via a communications network in accordance with a communications protocol, the communications protocol having a dynamic address variation facility for managing mobility of the first node with respect to the communications network, the code comprising: code to use the dynamic address variation facility to support a use of a second address to identify the first node instead of the first address in response to a non-mobility related requirement to use the second address to identify the first node for communicating a packet between the first node and the second node.

According to an eighth aspect of the present invention, there is provided a programmed computer for routing packets destined for a first node having a first address, the first node being capable of communicating with a second node via a communications network in accordance with a communications protocol, the communications protocol having a dynamic address variation facility for managing mobility of the first node with respect to the communications network, the computer comprising memory having at least one region for storing computer executable program code, and a processor for executing the program code stored in memory, wherein the program code includes: code to use the dynamic address variation facility to support a use of a second address to identify the first node instead of the first address in response to a non-mobility related requirement to use the second address to identify the first node for communicating a packet between the first node and the second node.

According to a ninth aspect of the present invention, there is provided a computer readable medium having computer executable software code stored thereon, the code being for routing packets destined for a first node having a first address, the first node being capable of communicating with a second node via a communications network in accordance with a communications protocol, the communications protocol having a dynamic address variation facility for managing mobility of the first node with respect to the communications network, and the code comprising: code to use the dynamic address variation facility to support a use of a second address to identify the first node instead of the first address in response to a non-mobility related requirement to use the second address to identify the first node for communicating a packet between the first node and the second node.

According to a tenth aspect of the present invention, there is provided a computer executable software code stored on a computer readable medium, the code being for routing packets destined for a first node having a first address associated with routing the packets from a second node to the first node via a first access network of a first type and a second address associated with routing packets from the second node to the first node via a second access network of a second type; the first and second types are different and interconnected by an intermediary network, the first and second access networks and the intermediary network being arranged to operate in accordance with a communications protocol having a dynamic address variation facility for managing mobility of the first node, the code comprising: code to use the dynamic address variation facility to support a use of the second address instead of the first address to identify the first node for communicating a packet between the first node and the second node in response to a requirement of the first node to communicate with the second node via the second access network instead of the first access network.

According to an eleventh aspect of the present invention, there is provided a programmed computer for routing packets destined for a first node having a first address associated with routing the packets from a second node to the first node via a first access network of a first type and a second address associated with routing packets from the second node to the first node via a second access network of a second type; the first and second types are different and interconnected by an intermediary network, the first and second access networks and the intermediary network being arranged to operate in accordance with a communications protocol having a dynamic address variation facility for managing mobility of the first node, comprising memory having at least one region for storing computer executable program code, and a processor for executing the program code stored in memory, wherein the program code includes: code to use the dynamic address variation facility to support a use of the second address instead of the first address to identify the first node for communicating a packet between the first node and the second node in response to a requirement of the first node to communicate with the second node via the second access network instead of the first access network.

According to a twelfth aspect of the present invention, there is provided a computer readable medium a computer readable medium having computer executable software code stored thereon, the code being for routing packets destined for a first node having a first address associated with routing the packets from a second node to the first node via a first access network of a first type and a second address associated with routing packets from the second node to the first node via a second access network of a second type; the first and second types are different and interconnected by an intermediary network, the first and second access networks and the intermediary network being arranged to operate in accordance with a communications protocol having a dynamic address variation facility for managing mobility of the first node, and the code comprising: code to use the dynamic address variation facility to support a use of the second address instead of the first address to identify the first node for communicating a packet between the first node and the second node in response to a requirement of the first node to communicate with the second node via the second access network instead of the first access network.

According to a thirteenth aspect of the present invention, there is provided a use of a dynamic address variation facility for managing mobility of a first node arranged to communicate with a second node via a communications network, the use comprising: using the dynamic address variation facility to support a use of a second address to identify the first node instead of a first address associated with the first node in response to a non-mobility related requirement to use the second address to identify the first node for communicating a packet between the first node and the second node.

According to a fourteenth aspect of the present invention, there is provided a use of a dynamic address variation facility for managing mobility of a first node arranged to communicate with a second node via a communications network, the first node having a first address associated with routing packets from the second node to the first node via a first access network of a first type, and the second node having a second address associated with routing packets from the second node to the first node via a second access network of a second type; the first and second types are different and interconnected by an intermediary network, the first and second access networks and the intermediary network being arranged to operate in accordance with a communications protocol having the dynamic address variation facility, the use comprising: using the address update facility to support a use of the second address instead of the first address to identify the first node for communicating a packet between the first node and the second node in response to a requirement of the first node to communicate with the second node via the second access network instead of the first access network.

BRIEF DESCRIPTION OF THE DRAWINGS

At least one embodiment of the present invention will now be described, by way of example only, with reference to the accompanying drawings, in which:

FIGS. 3.1 to 3.4 are flow diagrams of a first method constituting the first and/or second embodiment of the present invention;

DESCRIPTION OF PREFERRED EMBODIMENTS

Figure 1:
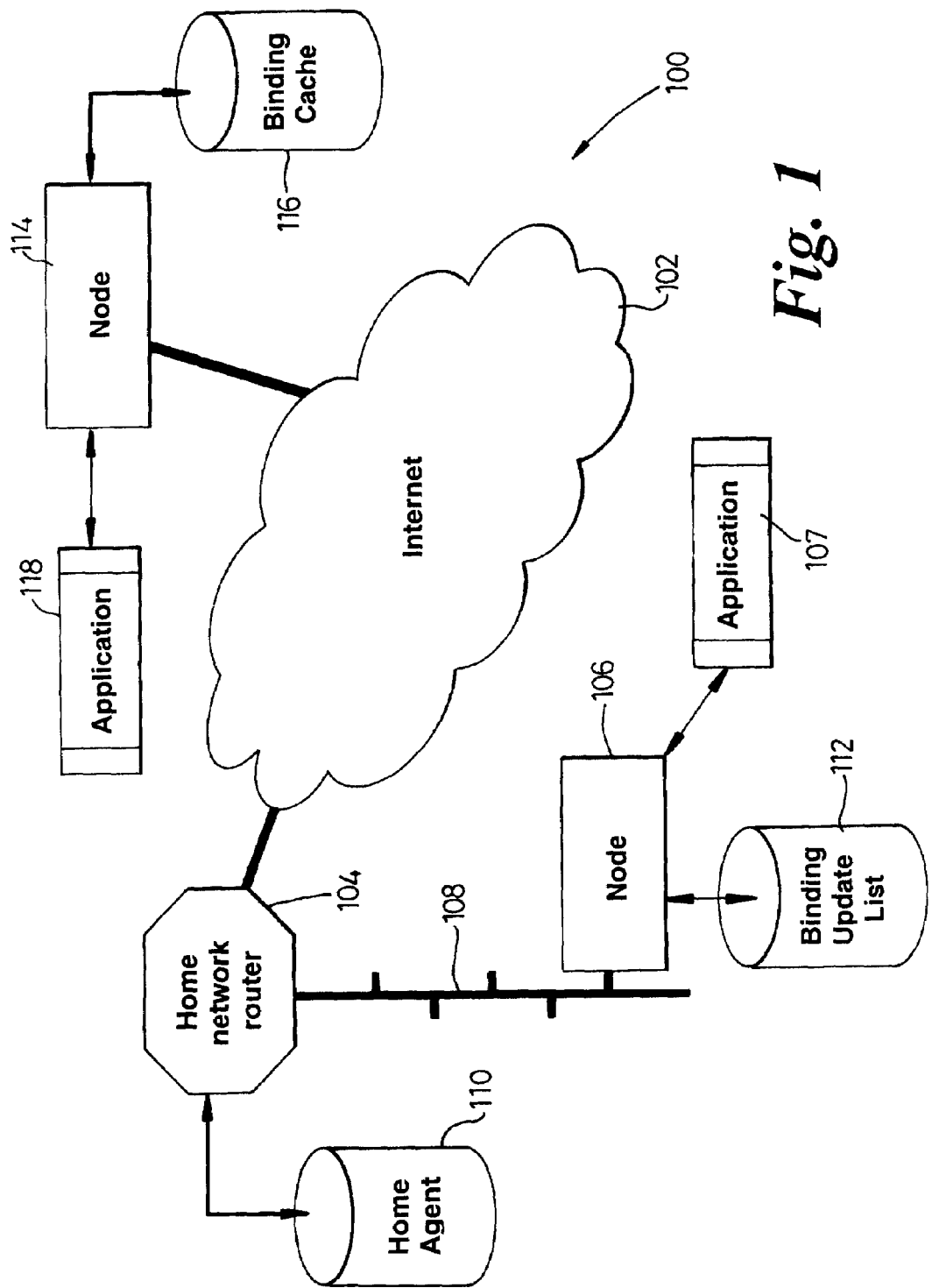
FIG. 1 is a schematic diagram of a communications system for use with a first and/or second embodiment of the present invention.

Throughout the description, identical reference numerals are used to identify like parts.

Referring to FIG. 1, a communications system 100 comprises an Internet 102, a home network router 104 being attached to the Internet 102 at a first topological point of attachment to the Internet 102. The home network router 104 is coupled to a first host 106 via a home link 108 having a home network prefix $P_H$ associated therewith. The first host 106 is capable of executing a first application 107. The home network router 104 is coupled to a home agent cache 110 that stores a home agent table. The home agent table stores the following fields: Subnet prefix ($P_H$), Home Address of the first host, Home/Away flag, Primary CareOf Address, Secondary CareOf Address(es). Additionally, the first host 106 has a first Binding Update (BU) list 112 for recording BUs in accordance with "Mobility Support in IPv6" (draft-ieff-mobileip-ipv6-12.txt, April 2000). The first BU list 112 stores the following fields: Home Address, Correspondent Address and CareOf Address.

At a second topological point of attachment to the Internet 102, a second host 114 is attached to the Internet 102. The second host 114 is capable of executing a second application 118. The second host 114 is coupled to a BU cache 116, the BU cache storing a list having the following fields: Home Address and Care of Address.

In accordance with the OSI communications model, the first host 106 and the second host 114 support a transport layer and an IP Layer (Layer 4).

For the purposes of ease of understanding and clarity, the structure of the Internet 102 will now be described in relation to a simplified domain structure. In relation to the simplified routing domain structure, references to "links" of routing domains should be understood as meaning physical connections that can carry communications at the IP layer.

Figure 2:
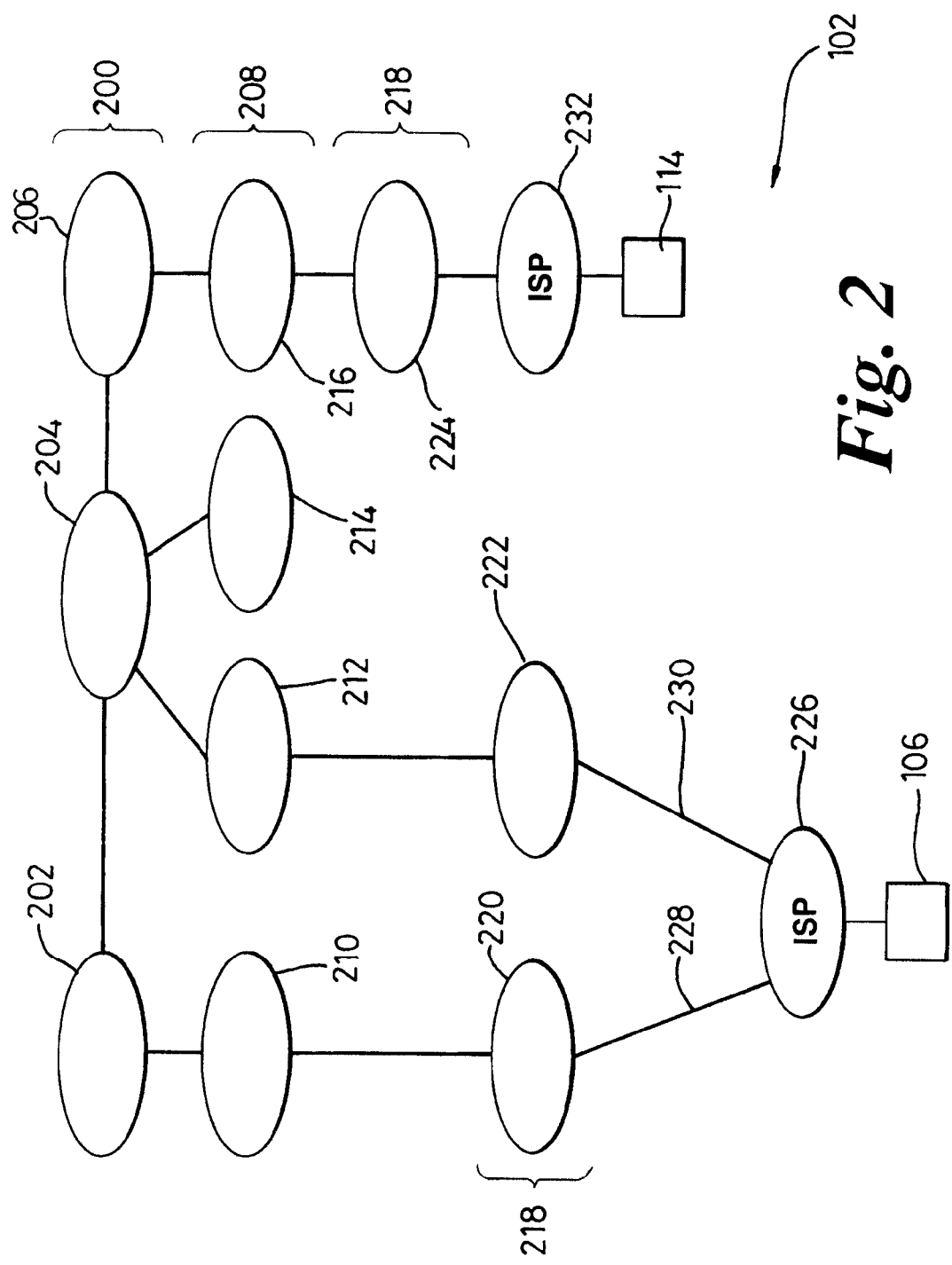
FIG. 2 is a schematic diagram, in more detail, of an Internet of FIG. 1.

Referring to FIG. 2, the Internet 102 comprises a first tier 200, sometimes known as a default-free zone, comprising a first first tier domain 202 linked to a second first tier domain 204, the second first tier domain 204 being linked to a third first tier domain 206. A second tier 208 comprises a first second tier domain 210, a second second tier domain 212, a third second tier domain 214 and a fourth second tier domain 216. The first second tier domain 210 is linked to the first first tier domain 202, the second second tier domain 212 is linked to the second first tier domain 204, the third second tier domain 214 is also linked to the second first tier domain 204, and the fourth second tier domain 216 is linked to the third first tier domain 206. A third tier 218 comprises a first third tier domain 220, a second third tier domain 222, and a third third tier domain 224. The first third tier domain 220 is linked to the first second tier domain 210, the second third tier domain 222 is linked to the second second tier domain 212, and the third third tier domain 224 is linked to the fourth second tier domain 216.

A first Internet Service Customer Domain (hereinafter referred to as a "customer domain") 226, constituting a first fourth tier domain, is linked to the first third tier domain 220 by a first path 228. The first customer domain 226 is also linked to the second third tier domain 222 by a second path 230. Consequently, the first customer domain 226 is multi-homed. A second customer domain 232, constituting a second fourth tier domain, is linked to the third third tier domain 224. The first host 106 is linked within the first customer domain 226 and the second host 114 is linked within the second customer domain 232. In accordance with IPv6, the first host 106 has a first IP address associated with the first path 228, and a second IP address associated with the second path 230. As a matter of policy, the first customer domain 226 assigns the first IP address as the Home Address. However, if required, the second, or other, IP address associated with the first host 106 can be assigned as the Home Address.

Although the above domain structure is simplified, it should be appreciated that the domain structure can comprise a greater or fewer number of domains than described above. Additionally, the domain structure can have a greater or fewer number of tiers than described above.

The above system and apparatus will now be described in the context of packets being communicated between the first and second hosts 106, 114. The packets are either: transmitted from the first host 106 to the second host 114, or transmitted from the second host 114 to the first host 106. Furthermore, a packet can either be an initial packet, i.e. transmitted between the first and second hosts 106, 114 at initiation of a communication therebetween, or a subsequent packet, i.e. transmitted after the initial packet therebetween. The initial and subsequent packets are structured in accordance with the IPv6.

In this example, the first path 228 becomes unavailable, for example, is deprecated. The first path 228 can become unavailable between the following periods of time:

1. Prior to transmission of the initial packet from the first host 106 to the second host 114, but before successful receipt by the second host 114 of the initial packet;
2. Prior to receipt by the second host 114 of the subsequent packet transmitted by the first host 106, but after successful receipt of an immediately previous packet by the first host 106;
3. Prior to transmission of the initial packet from the second host 114 to the first host 106, but before successful receipt by the first host 106 of the initial packet, and
4. After successful receipt of an immediately previous packet by the second host 114 from the first host 106, but before successful receipt by the first host 106 of the subsequent packet from the second host 114.

It should be appreciated that, although in this example, the first path 228 becomes unavailable, the second path 230 can become unavailable instead, or any other path of a multi-homed domain. Also, the above example is not limited to non-functioning paths; the example is also applicable to other requirements to use a particular path in preference to another path, for example, an administrative authority may decide, for systems administration convenience or efficiency (relative cost of communication or relative bandwidth of the links) that the second path 230 should be used instead of the first path 228 (a second embodiment). Alternatively, the first customer domain 226 may decide to use an alternative service provider, in which case a different path for communication with the second host 114 would normally be used by the first customer domain 226 through the alternative service provider, for example, the second path 230.

In operation (FIGS. 3.1 to 3.4), the first host 106 tries to transmit the packet to the second host 114. Referring to FIG. 3.1, the first host 106 establishes (step 300) whether the packet is the initial packet or the subsequent packet. If the packet is the initial packet, the first host 106 requests (step 301) a list of IP addresses from the Domain Name System (DNS) corresponding to the second host 114. The first host 106 then selects (step 302) a first of the IP addresses from the list of IP addresses from the DNS as the destination address of the initial packet. If, however, the packet is the subsequent packet, the first host 106 selects (step 303) the source address of an immediately previous received packet as the destination address of the subsequent packet. The first host 106 then selects a source address (step 304)using, in the case of the initial packet, the known proposed IPv6 address selection technique or, in the case of the subsequent packet, the destination address of the immediately previous received packet. Subsequently, the first host 106 establishes (step 305) whether a route to the second host 114 using the selected source address is unavailable using any mechanism known in the art. If the route is not unavailable (step 305), the first host 106 uses the selected addresses (step 310) and builds the packet (step 312); the packet, irrespective of whether the packet is the initial packet or the subsequent packet, is then transmitted (step 318) to the second host 114. If the route is unavailable, the second host 114 determines (step 306) whether an alternative route is available, for example, corresponding to the second IP address of the first host 106. If the alternative route does not exist, the communication is aborted (step 307).

If, however, the alternative route exists, the first host 106 determines (step 308) whether the packet is the initial packet or the subsequent packet. If the packet is the initial packet, the first host 106 selects a first IP address from the list of IP addresses obtained from the DNS as the destination address (using the known proposed IPv6 address selection technique) and uses (step 310) the second, alternative, IP address as the source address for the initial packet. The initial packet is then built (step 312) and transmitted to the second host 114 (step 318). Alternatively, if the packet is the subsequent packet, the first host either: creates (step 314) an entry in the BU list 112 comprising the IP address of the second host 114 in the Correspondent field, the source address of the packet prior to selection of the alternative IP address of the first host 106 in the Home address field, and the IP address of the alternative, second, IP address of the first host 106 in the CareOf field; or updates (step 314) an existing entry in the BU list 112 corresponding to the first host 106 so that the existing entry comprises the IP address of the second host 114 in the Correspondent field, the source address of the packet prior to selection of the alternative IP address of the first host 106 in the Home address field, and the IP address of the alternative, second, IP address of the first host 106 in the CareOf field. The first host 106 then builds (step 316) the subsequent packet using the second IP address of the first host as the source address of the subsequent packet, and the IP address of the second host 114 as the destination address. Additionally, the subsequent packet includes an AsFrom option, the AsFrom option comprising the first IP address of the first host 106, i.e. an AsFrom address. The subsequent packet is then transmitted (step 318) to the second host 114.

The first host 106 then determines (step 320) whether delivery of the packet transmitted to the second host 114 failed, for example, by receipt of an Internet Control Management Protocol (ICMP) destination unreachable message. If the delivery of the packet failed, the first host repeats the above described procedure from the step of determining the alternative available IP address (steps 304 to 320).

Referring to FIG. 3.2, if the packet was successfully delivered to the second host 114, the second host 114 receives (step 322) the packet and determines (step 324) whether the packet bears the AsFrom option. If the packet does not bear the AsFrom option, the second host 114 determines (step 326) whether the BU cache 116 comprises a BU cache entry having, in the CareOf address field, an IP address corresponding to the source address of the packet. If the BU cache 116 does not comprise the BU cache entry having, in the CareOf address field, an IP address corresponding to the source address of the packet, the second host 114 treats (step 328) the source address of the packet as corresponding to the source of the packet. However, if the BU cache entry has, in the CareOf address field, an IP address corresponding to the source address of the packet, the second host 114 treats (step 330) the Home address in the BU cache entry corresponding to the IP address in the CareOf address field as the source address of the packet. Subsequently, the second host 114 processes (step 340) the packet as normal for the second application 118.

If the packet bears the AsFrom option (step 324), the second host 114 then determines (step 332) whether the BU cache 116 comprises an entry for the AsFrom address borne by the packet. If the BU cache 116 comprises the entry for the AsFrom address, the entry for the AsFrom address is updated (step 224) with the source address of the packet, i.e. the second, alternative, IP address of the first host 106. If the entry does not exist, the entry is created (step 336) in the BU cache 116 comprising the AsFrom address in the Home address field and the second, alternative, IP address of the first host 106 in the CareOf field.

The AsFrom address is then treated (step 338) as the source address of the packet, and the packet is processed (step 340) as normal by the second host 114 for the second application 118.

In a case where the second host 114 tries to transmit the packet to the first host 106 (FIG. 3.3), the second host 114 establishes (step 342) whether the packet is the initial packet or the subsequent packet. If the packet is the initial packet, the second host requests (step 344) a list of IP addresses from the DNS, but this time, the list corresponds to the first host 106. The second host 114 then selects (step 346) a first of the IP addresses from the list of IP addresses from the DNS as the destination address of the initial packet. If, however, the packet is the subsequent packet, the second host 114 selects (step 348) the source address of an immediately previous received packet as the destination address of the subsequent packet. The second host 114 then determines (step 350) whether the BU cache 116 comprises an entry having the destination address selected for the initial or subsequent packet. If the BU cache 116 does not comprise the entry having the destination address selected for the initial or subsequent packet, the second host 114 uses (step 352) the destination address selected as the destination address for construction of the packet. If however, the BU cache 116 comprises the entry having the destination address selected for the initial or subsequent packet, the second host 114 uses (step 354) an IP address in the CareOf field of the entry as the destination address for construction of the packet, i.e. the second IP address of the first host 106, in this example.

The packet is then built (step 356) and transmitted (step 358) to the first host 106. The second host 114 then determines (step 360) whether or not delivery of the packet to the first host 106 has failed, for example by receipt of the ICMP destination unreachable message. If the delivery of the packet has failed, the second host refers back to the list of IP addresses provided by the DNS to establish whether the list comprises other IP addresses associated with delivery of packets to the first host 106. If the other IP addresses do not exist, the second host 114 aborts (step 364) the communication. Otherwise, the second host 114 selects (step 366) a second IP address from the list of IP addresses from the DNS, i.e. the second IP address of the first host 106, in this example.

The second host 114 then determines (step 368) whether the packet is the initial packet or the subsequent packet. If the packet is the initial packet, the second host 114 either: creates (step 370) an entry in the BU cache 116 comprising the source address of the packet in the Home address field and the second IP address from the list of IP addresses provided by the DNS in the CareOf address field; or updates (step 370) an existing entry in the BU cache 116 having the source address currently borne by the packet in the CareOf address field, by updating the CareOf address field to comprise the second IP address of the first host 106 obtained from the DNS. The second host 114 then uses (step 372) the second IP address of the first host 106 to rebuild (step 356) the packet.

Similarly, if the second host 114 determines (step 368) that the packet is the subsequent packet, the second host 114 uses (step 372) the second IP address from the list of IP addresses provided by the DNS as the destination address of the packet, and rebuilds (step 356) the packet. The above-described procedure for the determination of the destination address for the packet is repeated (steps 356 to 372) every time delivery of the packet to the first host 106 fails and the list of IP addresses provided by the DNS still comprises IP addresses that have not yet been tried by the second host 116 to transmit the packet to the first host 106.

Referring to FIG. 3.4, if delivery of the packet is successful, the first host 106 receives (step 374) the packet and analyses the source address of the packet. The first host 106 determines (step 376) whether the BU list 112 comprises an entry having, in the Correspondent field, the source address of the packet. If the BU list 112 does not comprise the entry having, in the Correspondent field, the source address of the packet, the packet is the initial packet and the first host creates (step 378) the entry in the BU list 112 having: the source address of the packet in the Correspondent field, and the destination address of the packet in both the CareOf address field and the Home address field. The first host 106 then processes (step 384) the packet as normal for the first application 107 requiring the packet.

If the Correspondent field of the entry in the BU list 112 comprises the source address of the packet, the first host 106 treats (step 380) an IP address in the Home address field of the entry corresponding to the destination address. The first host 106 then updates (step 382) the CareOf field of the entry to the source address of the packet. The first host 106 then processes (step 384) the packet as normal for the first application 107 requiring the packet.

Figure 4:
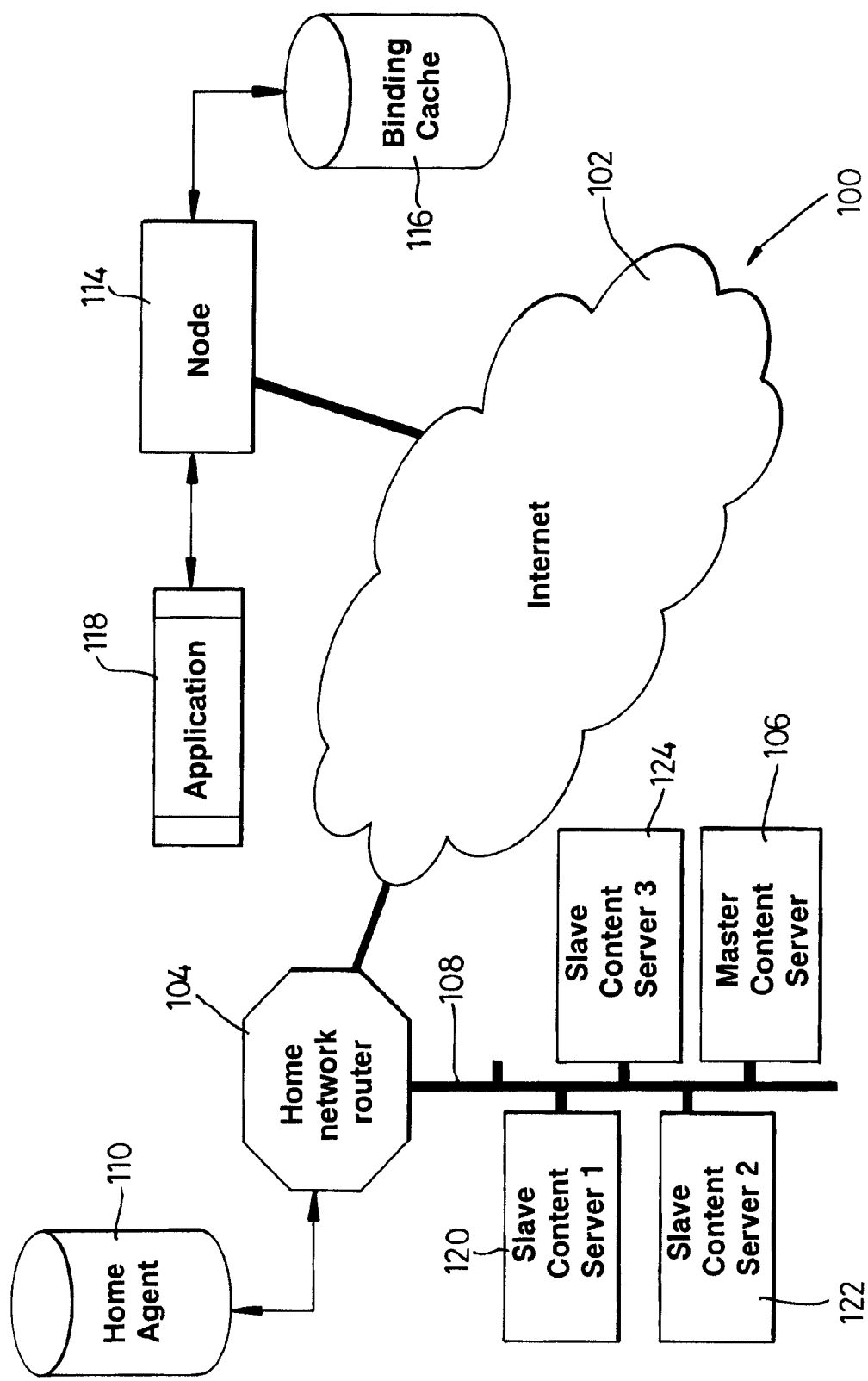
FIG. 4 is a schematic diagram of a communications system for use with a third embodiment of the present invention.

In a third embodiment of the invention (FIG. 4), the communications system 100 is supplemented by coupling a first slave web content server 120, a second slave web content server 122 and a third slave web content server 124 to the home link 108. In this example, the first host 106 is a master web content server and is used to support, in this example, a web site that is browsed by a large number of people through respective web browsers, for example a news service web site, by balancing traffic loads between the first, second and third slave web content servers 120, 122, 124. The first, second and third web content servers 120, 122, 124 each store and are able to retrieve content, the content stored by each of the first, second and third web content servers 120, 122, 124 being substantially the same. The master web content server 106 has a BU list. The second host 114, in this example, acts as a client wanting to obtain content by accessing the web site.

Figure 5:
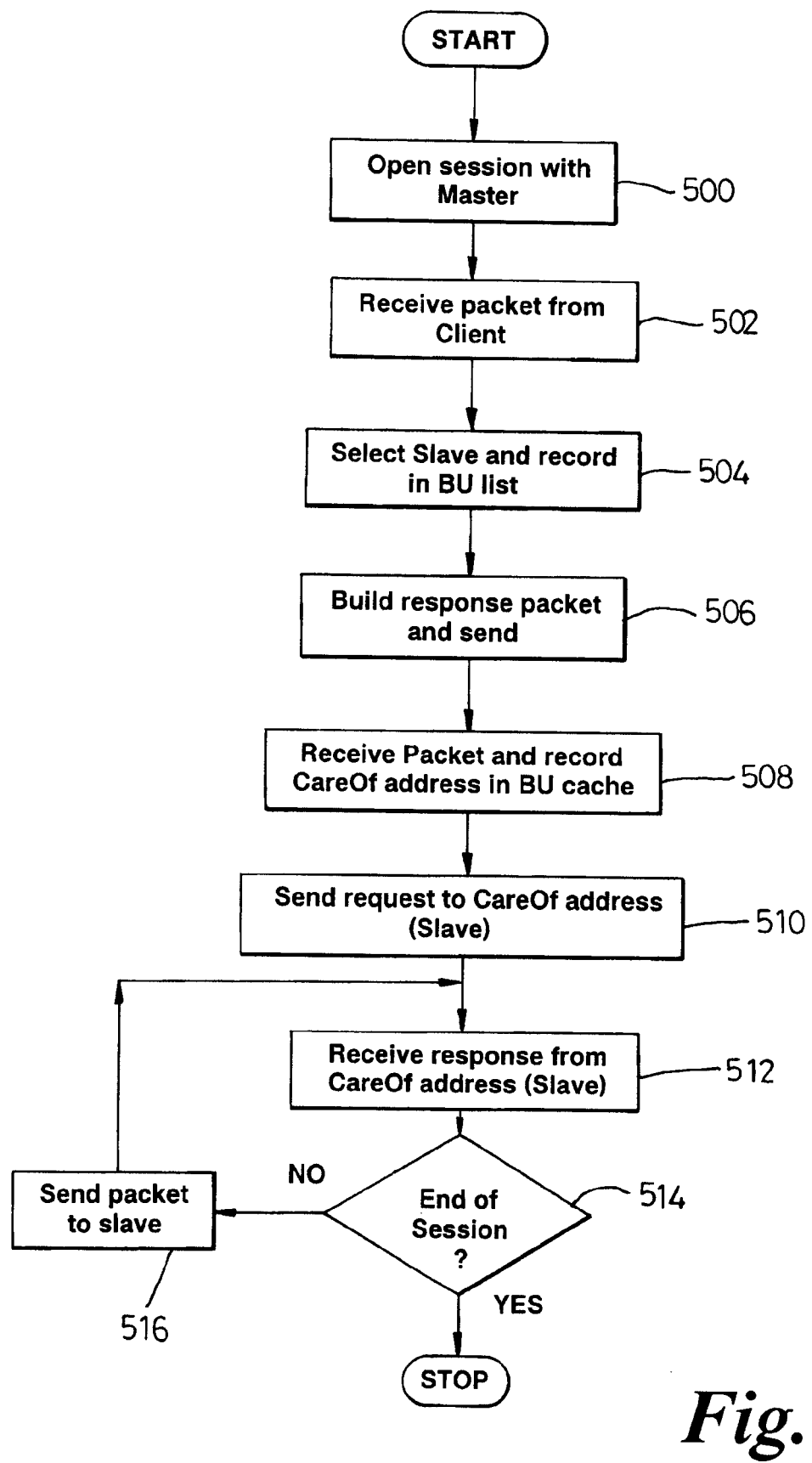
FIG. 5 is a flow diagram of a second method constituting the third embodiment of the present invention.

In operation (FIG. 5), the client 114 tries to open a TCP session by transmitting (step 500) an initial packet to the master content server 500. The master consequently receives (step 503) the initial packet from the client 114 and selects (step 504) one of the first, second or third slave web content servers 120, 122, 124 to communicate with the client 114. Additionally, the master content server 106 records, in the BU list, an IP address of the client 114 in the Correspondent field, an IP address of the master content server 106 in the Home address field, and an IP address of the selected one of the first, second or third slave web content servers 120, 122, 124 in the CareOf address field.

Subsequently, the master content server 106 build and sends (step 506) a first reply packet using an alternate CareOf address sub-option of a Binding Update option of the IPv6. The alternate CareOf address sub-option comprises the IP address of the selected one of the first, second or third slave web content servers 120, 122, 124. The client 114 receives (step 508) the first reply packet from the master content server 106 and records an entry in the BU cache 116 bearing the IP address of the master content server 106 in the Home address field and the CareOf address IP address of the selected one of the first, second or third slave web content servers 120, 122, 124 in the CareOf address field.

The client 114 then builds and sends (step 510) a subsequent packet directly to the selected one of the first, second or third slave web content servers 120, 122, 124. In reply, the selected one of the first, second or third slave web content servers 120, 122, 124 builds and sends (step 512) a first subsequent reply packet to the client 114. Until it is determinates (step 514) that the session is to end, the client 114 continues to build and send (step 516) packets to the selected one of the and the selected one of the first, second or third slave web content servers 120, 122, 124 also continues to build and send (step 512) packets for transmission to the client 114.

If required, the selected one of the first, second or third slave web content servers 120, 122, 124 can be arranged to transfer the communication with the client 114 to one of the other first, second or third slave web content servers 120, 122, 124 using the mobility facility provided by the IPv6.

Figure 6:
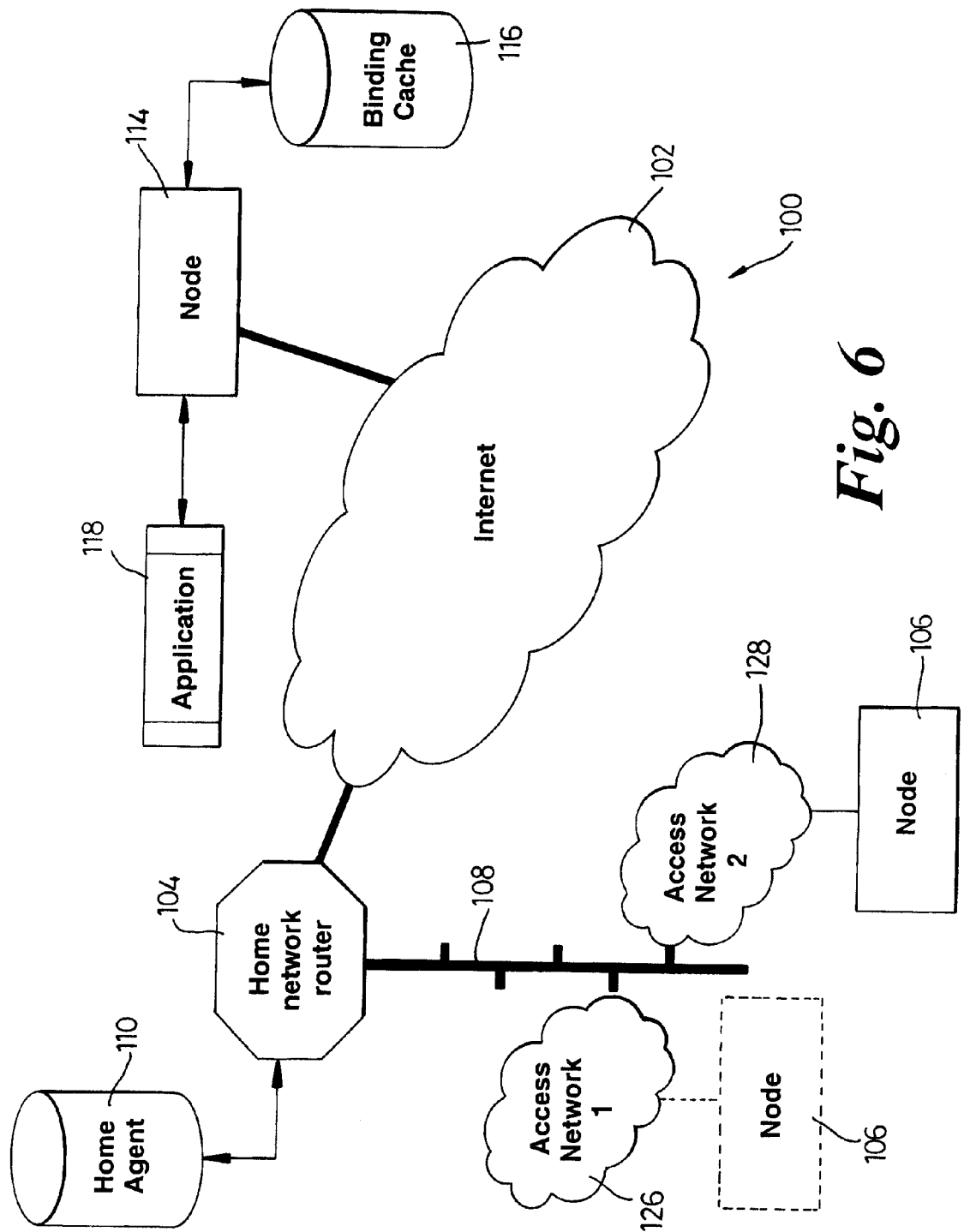
FIG. 6 is a schematic diagram of a communications system for use with a fourth embodiment of the present invention.

In a fourth embodiment of the invention (FIG. 6), the communications system 100 is supplemented by a first access network 126, for example a cellular communications network, and a second access network 128, for example a wireless Local Area Network (LAN). The first access network 126 and the second access networks 128 are respectively attached to the home link 108. In this example, the first IP address of the first host 106 corresponds to communications with the first host 106 via the first access network 126. Similarly, the second IP address of the first host 106 corresponds to communications with the first host 106 via the second access network 128.

In operation, communication between the first and second hosts 106, 114 is in accordance with the method of FIGS. 3.1 to 3.4 However, the first and second IP addresses of the first host 106 are now associated with the first and second access networks 126, 128 instead of the first and second paths 228, 230. A handover between the first and second access networks 126, 128 using any suitable technique known in the art is treated in the same way as the first path 228 becoming unavailable and the second path 230 being used for communications between the first and second hosts 106, 114.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

The invention claimed is:

1. A communications system comprising a first node having a first IP address associated with a first path from said node to a communications network, the first node being arranged to communicate with a second node via said communications network in accordance with a communications protocol, the communications protocol having a dynamic IP address variation facility for managing mobility of the first node with respect to the communications network, wherein the communications protocol is arranged to use the dynamic IP address variation facility to support a use of a dynamic IP address of the first node associated with a second path from said node to the communications network to identify the first node instead of the first IP address in response to a non-mobility related requirement to use the second IP address to identify the first node for communicating a packet between the first node and the second node.

2. The system as claimed in claim 1, wherein the non-mobility related requirement to use the second IP address to identify the first node for communicating a packet between the first node and the second node is a requirement to use the second IP address as a result of all routes between the first and second nodes corresponding to the first IP address becoming deprecated in relation to the first node.

3. The system as claimed in claim 1, wherein the non-mobility related requirement to use the second IP address to communicate a packet between the first node and the second node is a requirement to use the second IP address as a result of all routes between the first and second nodes corresponding to the first IP address failing or becoming unavailable in relation to the first node.

4. The system as claimed in claim 1, wherein the non-mobility related requirement to use the second IP address to communicate a packet between the first node and the second node is a requirement to route the packet originating from the second node to a third node.

5. A communications system comprising a first node having a first IP address associated with routing packets from a second node to the first node via a first access network of a first type and a second IP address associated with routing packets from the second node to the first node via a second access network of a second type; the first and second types are different and interconnected by an intermediary network, the first and second access networks and the intermediary network being arranged to operate in accordance with a communications protocol having a dynamic IP address variation facility for managing mobility of the first node, wherein the communications protocol is arranged to use the dynamic IP address variation facility to support a use of the second IP address instead of the first IP address to identify the first node for communicating a packet between the first node and the second node in response to a requirement of the first node to communicate with the second node via the second access network instead of the first access network.

6. A node apparatus for a communications network, the apparatus comprising a first IP address associated with a first path from said node to the communications network and being arranged to communicate with a second node via the communications network in accordance with a communications protocol, the communications protocol having a dynamic IP address variation facility for managing mobility of the node apparatus with respect to the communications network, wherein the communications protocol is arranged to use the dynamic IP address variation facility to support a use of a second IP address of the first node associated with a second path from said node to the communications network to identify the first node instead of the first IP address in response to a non-mobility related requirement to use the second IP address to identify the node apparatus for communicating a packet between the first node and the second node.

7. The apparatus as claimed in claim 6, wherein the non-mobility related requirement to use the second IP address to identify the first node for communicating a packet between the first node and the second node is a requirement to use the second IP address as a result of all routes between the first and second nodes corresponding to the first IP address becoming deprecated in relation to the first node.

8. The apparatus as claimed in claim 6, wherein the non-mobility related requirement to use the second IP address to communicate a packet between the first node and the second node is a requirement to use the second IP address as a result of all routes between the first and second nodes corresponding to the first IP address failing or becoming unavailable in relation to the first node.

9. The apparatus as claimed in claim 6, wherein the non-mobility related requirement to use the second IP address to communicate a packet between the first node and the second node is a requirement to route the packet originating from the second node to a third node.

10. A node apparatus for a communications network, the apparatus comprising a first IP address associated with routing packets from a second node to the first node via a first access network of a first type and a second IP address associated with routing packets from the second node to the first node via a second access network of a second type; the first and second types are different and interconnected by an intermediary network, the first and second access networks and the intermediary network being arranged to operate in accordance with a communications protocol having a dynamic IP address variation facility for managing mobility of the node apparatus, wherein the communications protocol arranged to use the dynamic IP address variation facility to support a use of the second IP address instead of the first IP address to identify the first node for communicating a packet between the first node and the second node in response to a requirement of the first node to communicate with the second node via the second access network instead of the first access network.

11. A method of routing packets destined for a first node having a first IP address associated with a first path from said node to a communications network, the first node being arranged to communicate with a second node via said communications network in accordance with a communications protocol, the communications protocol having a dynamic IP address variation facility for managing mobility of the first node with respect to the communications network, the method comprising the step of:

using the dynamic IP address, variation facility to support a use of a second IP address of the first node associated with a second path from said node to the communications network to identify the first node instead of the first IP address in response to a non-mobility related requirement to use the second IP address to identify the first node for communicating a packet between the first node and the second node.

12. The method as claimed in claim 11, wherein the non-mobility related requirement to use the second IP address to identify the first node for communicating a packet between the first node and the second node is a requirement to use the second IP address as a result of all routes between the first node and the second node corresponding to the first IP address becoming deprecated in relation to the first node.

13. The method as claimed in claim 11, wherein the non-mobility related requirement to use the second IP address to communicate a packet between the first node and the second node is a requirement to use the second address as a result of all routes between the first and second nodes corresponding to the first address failing or becoming unavailable in relation to the first node.

14. The method as claimed in claim 11, wherein the non-mobility related requirement to use the second address to communicate a packet between the first node and the second node is a requirement to route the packet originating from the second node to a third node.

15. A method of routing packets destined for a first node having a first address associated with routing the packets from a second node to the first node via a first access network of a first type and a second IP address associated with routing packets from the second node to the first node via a second access network of a second type; the first and second types are different and interconnected by an intermediary network, the first and second access networks and the intermediary network being arranged to operate in accordance with a communications protocol having a dynamic IP address variation facility for managing mobility of the first node, the method comprising the step of:

using the dynamic IP address variation facility to support a use of the second IP address instead of the first IP address to identify the first node for communicating a packet between the first node and the second node in response to a requirement of the first node to communicate with the second node via the second access network instead of the first access network.

16. Computer executable software code stored on a computer readable medium, the code being routing packets destined for a first node having a first IP address associated with a first path from said node to a communications network, the first node being arranged to communicate with a second node via said communications network in accordance with a communications protocol, the communications protocol having a dynamic IP address variation facility for managing mobility of the first node with respect to the communications network, the code comprising:

code to use the dynamic IP address variation facility to support a use of a second IP address of the first node associated with a second path from said node to the communications network to identify the first node instead of the first IP address in response to a non-mobility related requirement to use the second IP address to identify the first node for communicating a packet between the first node and the second node.

17. A programmed computer for routing packets destined for a first node having a first IP address associated with a first path from said node to a communications network, the first node being arranged to communicate with a second node via said communications network in accordance with a communications protocol, the communications protocol having a dynamic IP address variation facility for managing mobility of the first node with respect to the communications network, the computer comprising memory having at least one region for storing computer executable program code, and a processor for executing the program code stored in memory, wherein the program code includes:
code to use the dynamic IP address variation facility to support a use of a second IP address of the first node associated with a second path from said node to the communications network to identify the first node instead of the first IP address in response to a non-mobility related requirement to use the second IP address to identify the first node for communicating a packet between the first node and the second node.

18. A computer readable medium having computer executable software code stored thereon, the code being for routing packets destined for a first node having a first IP address associated with a first path from said node to a communications network, the first node being arranged to communicate with a second node via said communications network in accordance with a communications protocol, the communications protocol having a dynamic IP address variation facility for managing mobility of the first node with respect to the communications network, and the code comprising:

code to use the dynamic IP address variation facility to support a use of a second IP address of the first node associated with a second path from said node to the communications network to identify the first node instead of the first IP address in response to a non-mobility related requirement to use the second IP address to identify the first node for communicating a packet between the first node and the second node.

19. Computer executable software code stored on a computer readable medium, the code being for routing packets destined for a first node having a first IP address associated with routing the packets from a second node to the first node via a first access network of a first type and a second IP address associated with routing packets from the second node to the first node via a second access network of a second type; the first and second types are different and interconnected by an intermediary network, the first and second access networks and the intermediary network being arranged to operate in accordance with a communications protocol having a dynamic IP address variation facility for managing mobility of the first node, the code comprising:

code to use the dynamic IP address variation facility to support a use of the second IP address instead of the first address to identify the first node for communicating a packet between the first node and the second node in response to a requirement of the first node to communicate with the second node via the second access network instead of the first access network.

20. A programmed computer for routing packets destined for a first node having a first IP address associated with routing the packets from a second node to the first node via a first access network of a first type and a second IP address associated with routing packets from the second node to the first node via a second access network of a second type; the first and second types are different and interconnected by an intermediary network, the first and second access networks and the intermediary network being arranged to operate in accordance with a communications protocol having a dynamic IP address variation facility for managing mobility of the first node, comprising memory having at least one region for storing computer executable program code, and a processor for executing the program code stored in memory, wherein the program code includes:

code to use the dynamic IP address variation facility to support a use of the second ID address instead of the first IP address to identify the first node for communicating a packet between the first node and the second node in response to a requirement of the first node to communicate with the second node via the second access network instead of the first access network.

21. A computer readable medium having computer executable software code stored thereon, the code being for routing packets destined for a first node having a first IP address associated with routing the packets from a second node to the first node via a first access network of a first type and a second IP address associated with routing packets from the second node to the first node via a second access network of a second type; the first and second types are different and interconnected by an intermediary network, the first and second access networks and the intermediary network being arranged to operate in accordance with a communications protocol having a dynamic IP address variation facility for managing mobility of the first node, and the code comprising:

code to use the dynamic IP address variation facility to support a use of the second IP address instead of the first IP address to identify the first node for communicating a packet between the first node and the second node in response to a requirement of the first node to communicate with the second node via the second access network instead of the first access network.

22. A use of a dynamic IP address variation facility for managing mobility of a first node arranged to communicate with a second node via a communications network, the use comprising: using the dynamic IP address variation facility to support a use of a second IP address associated with the first node for a second path from said node to the communications network to identify the first node instead of a first address associated with the first node for a first Path from said node to the communications network in response to a non-mobility related requirement to use the second IP address to identify the first node for communicating a packet between the first node and the second node.

23. A use of a dynamic IP address variation facility for managing mobility of a first node arranged to communicate with a second node via a communications network, the first node having a first IP address associated with routing packets from the second node to the first node via a first access network of a first type, and the second node having a second IP address associated with routing packets from the second node to the first node via a second access network of a second type; the first and second types are different and interconnected by an intermediary network, the first and second access networks and the intermediary network being arranged to operate in accordance with a communications protocol having the dynamic IP address variation facility, the use comprising: using the address update facility to support a use of the second IP address instead of the first IP address to identify the first node for communicating a packet between the first node and the second node in response to a requirement of the first node to communicate with the second node via the second access network instead of the first access network.

* * * * *